(12) United States Patent
Newton

(10) Patent No.: US 8,718,240 B2
(45) Date of Patent: May 6, 2014

(54) THIRD PARTY CALL CONTROL

(75) Inventor: Donald Newton, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1566 days.

(21) Appl. No.: 11/832,244

(22) Filed: Aug. 1, 2007

(65) Prior Publication Data

US 2009/0034695 A1   Feb. 5, 2009

(51) Int. Cl.
*H04M 1/64* (2006.01)
(52) U.S. Cl.
USPC ................. 379/88.17; 379/88.13
(58) Field of Classification Search
USPC ............ 379/88.17, 88.03, 201.1, 88.12
See application file for complete search history.

(56) References Cited

U.S. PATENT DOCUMENTS

| | | | | |
|---|---|---|---|---|
| 6,404,860 B1* | 6/2002 | Casellini | ............ | 379/88.17 |
| 6,950,503 B2* | 9/2005 | Schwartz et al. | ........ | 379/88.13 |
| 7,133,504 B2* | 11/2006 | Fostick | ............ | 379/88.14 |
| 7,197,120 B2* | 3/2007 | Luehrig et al. | ........ | 379/88.14 |
| 7,224,774 B1* | 5/2007 | Brown et al. | ........ | 379/88.14 |
| 7,305,068 B2* | 12/2007 | Tucker et al. | ........ | 379/88.11 |
| 7,313,228 B1* | 12/2007 | Sorice et al. | ........ | 379/88.17 |
| 7,477,907 B2* | 1/2009 | Koch et al. | ........ | 455/456.2 |
| 7,801,284 B1* | 9/2010 | Chakra et al. | ........ | 379/88.03 |
| 2004/0146144 A1* | 7/2004 | Gao et al. | ........ | 379/88.12 |
| 2005/0123106 A1* | 6/2005 | Gao et al. | ........ | 379/88.17 |

* cited by examiner

*Primary Examiner* — Fan Tsang
*Assistant Examiner* — Van D Huynh
(74) *Attorney, Agent, or Firm* — Cantor Colburn LLP

(57) ABSTRACT

One embodiment of a method for controlling disposition of a call comprises detecting an incoming call to a network station; checking for an active instant messaging session for the network station; and if the active instant messaging session exists, sending an instant message to the network station with call disposition choices with regard to the incoming call. Other methods and systems are also provided.

6 Claims, 8 Drawing Sheets

THIRD PARTY CALL CONTROL

CROSS-REFERENCE TO RELATED APPLICATION

Not applicable.

COPYRIGHT NOTICE

Not applicable.

STATEMENT REGARDING FEDERALLY SPONSORED RESEARCH OR DEVELOPMENT

Not applicable.

TECHNICAL FIELD

The present disclosure is generally related to the field of communications and, more particularly, is related to services that enable a called party to dispose of an incoming call.

BACKGROUND

Telecommunications has experienced explosive growth, and more growth is planned as telecommunication access and numerous communication devices improve. One recent service offered to subscribing customers is a telephone exchange service, whether private or hosted by a common carrier. With a telephone exchange service, telephone calls between extensions or end points are able to be directed to a particular extension based on commands of an end user. Currently for this type of functionality to be offered, an end user has to purchase or provide payment for expensive hardware to provide exchange services which is typically proprietary and not portable to similar services offered by another provider.

SUMMARY

Embodiments of the present disclosure provide systems and methods for controlling disposition of a call. One embodiment of such a method comprises detecting an incoming call to a network station; checking for an active instant messaging session for the network station; and if the active instant messaging session exists, sending an instant message to the network station with call disposition choices with regard to the incoming call.

Other methods, systems, computer products, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure now will be described more fully hereinafter with reference to the accompanying drawings, in which exemplary embodiments are shown. Embodiments should not be construed as being limited to the examples described herein; rather, these examples are provided so that this disclosure will be thorough and complete, and will fully convey the scope of the present disclosure to those of ordinary skill in the art. Moreover, all statements herein reciting embodiments of the present disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the flowcharts, block diagrams, and the like represent conceptual views or processes illustrating systems and methods embodying the present disclosure. The functions of the various elements shown in the figures may be provided through the use of dedicated hardware as well as hardware capable of executing associated software.

Figure 1:
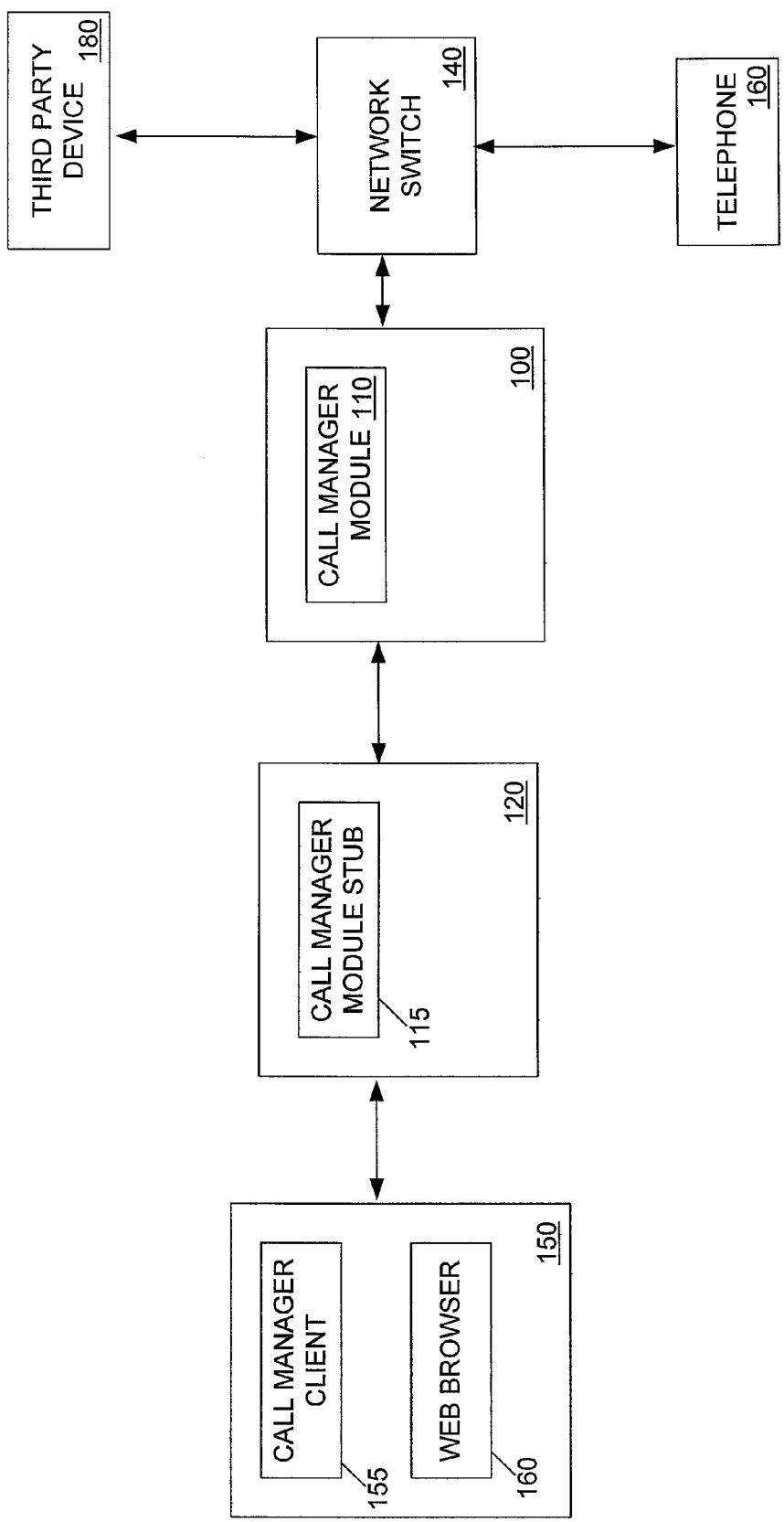
FIG. 1 is a block diagram of an embodiment of a system, among others, for controlling disposition of a call in accordance with the present disclosure.

Referring now to the figures, FIG. 1 is a block diagram showing a call manager module 110 residing in a computer system 100, examples of which include a server. The call manager module 110 may be a web service offered by a server 100. The server 100 is a feature server for voice over Internet Protocol (VoIP) communications, in some embodiments.

In VoIP services, a subscriber may setup VoIP services by registering with a VoIP service provider and being assigned one or more VoIP telephone numbers. The VoIP service provider can then route phone calls from/to the VoIP telephone number(s) assigned to the subscriber based on a called telephone number (i.e., the telephone number to which the phone call is directed). For example, a VoIP service provider may route and establish a phone call from the VoIP communication equipment through the Internet and through the Public Switched Telephone Network (PSTN).

A VoIP feature server, such as server 100 in one embodiment, may be, for example, BroadWorks platform by Broadsoft, and can include subscriber information used for routing calls to/from subscribers. A VoIP soft switch, such as network switch 140 in one embodiment, can provide a bridge between the Internet and PSTN. The VoIP feature server and/or the softswitch may perform one or more of the operations for routing and establishing VoIP phone calls. The feature server is the functional component that provides call-related features, such as call forwarding call waiting, last call return, etc and works closely with the network switch.

Referring back to FIG. 1, the call manager module 110 may communicate with a call manager module stub 115 in an instant messaging server 120. The call manager module 110 calls the call manager module stub 115 to perform a task at the instant messaging server 120, and the stub 115 returns the results to the call manager module 110. The call manager module 110 is also configured to communicate with a network switch 140 (e.g., VoIP switch, Public Switched Telephone Network (PSTN) switch, softswitch), which routes telephone or network communications. In one or more embodiments, functionality of a feature server and a network switch may be combined in a single computing device. Therefore, embodiments of the present disclosure are not limited to the example represented in FIG. 1.

A call manager client 155 operates within a computer system 150. The call manager client 155 may communicate with the instant messaging server 120 and the call manager module stub 115. According to exemplary embodiments, the call manager client 155 allows for a called party to provide instructions for disposing of an incoming call using an instant messaging session. Accordingly, the call manager module 110 and call manager client 155 help implement Third Party Caller Control (3PCC) of call disposition according to an embodiment of the present disclosure. Such a system includes the computer system 100, the call manager client 155 (including the IP address associated with an instant messaging session and data connection) residing within computer system 100, an instant messaging server 120 associated with the instant messaging session; a call manager module stub 115 which is a process of the instant messaging server 120 that communicates with the call manager module 110 of a Server 100; a network switch 140 (e.g., VoIP switch); and network telephone 160.

Figure 2:
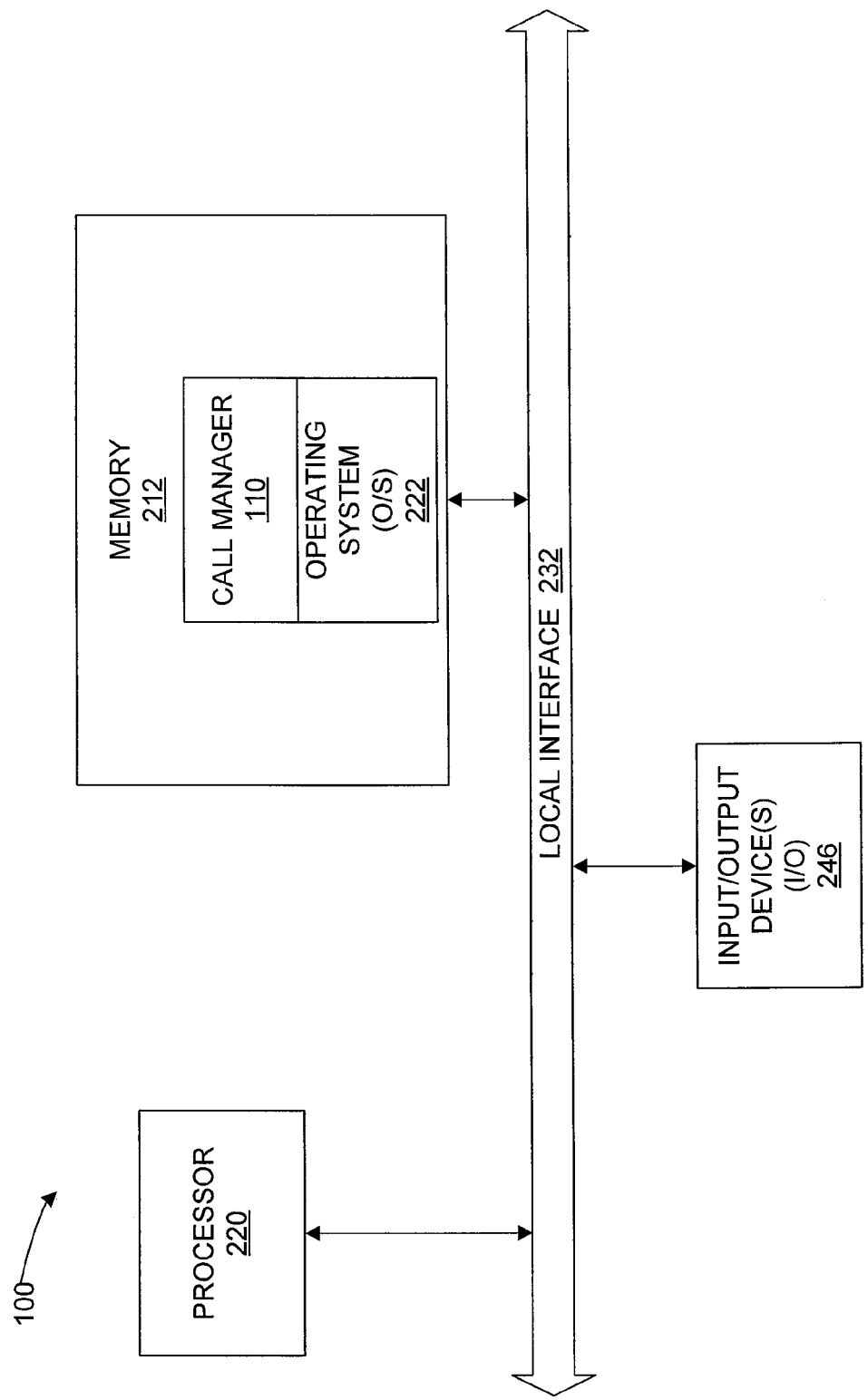
FIG. 2 is a block diagram of an embodiment of a server utilized in the system of FIG. 1.

In one embodiment, the call manager module 115 which brokers Third Party Call Control (3PCC) services registers with the instant messaging server 120 as an external component. The call manager module 110 operates within a system memory device. The call manager module 110, for example, is shown residing in a memory subsystem 212 in FIG. 2. The call manager module 110, however, could also reside in flash memory or a peripheral storage device. The call manager module 110 may be downloaded from a network server or provided on a storage media (e.g., diskette, CD-ROM, or installed by the computer system manufacturer) to a subscribing customer or user to install on the computer system 100 to enable, disable, and further control a variety of the 3PCC services (e.g., providing call handling options, such as routing an incoming call to voice mail, transferring an incoming call to a particular exchange, call-waiting, setting up conference call, placing a call on hold, etc.).

The computer system 100 also has one or more central processors 220 executing an operating system 222. The operating system 222, as is well known, has a set of instructions that control the internal functions of the computer system 100. A system bus or local interface 232 communicates signals, such as data signals, control signals, and address signals, between the central processor 220 and system components. The computer system includes one or more input and/or output (I/O) devices 246 (or peripherals) that are communicatively coupled via the local interface 232.

In one embodiment, an interface to the call manager client 155 may be embedded in a web page that is loaded in a web browser 160. Upon start up of the call manager client 155, the client 150 connects to the instant messaging server 120 and performs a login to the server 120. The client 150 then establishes presence with the call manager module 110 and passes credentials to authenticate the client 150 and associated user(s). The instant messaging server 120 establishes an instant messaging session on behalf of the client 150 and sets up a connection with the call manager module 110, which communicates with a network switch 140.

In one embodiment, the instant messaging server 120 utilizes a publish-subscribe (pubsub) model to relay presence information, where users or applications subscribe to receive notifications of presence information and presence information is updated. Subscription requests may have to be approved or be pre-approved by the user or application providing the presence information to the instant messaging server 120. Only approved subscribers may then retrieve updated presence information.

Figure 3:
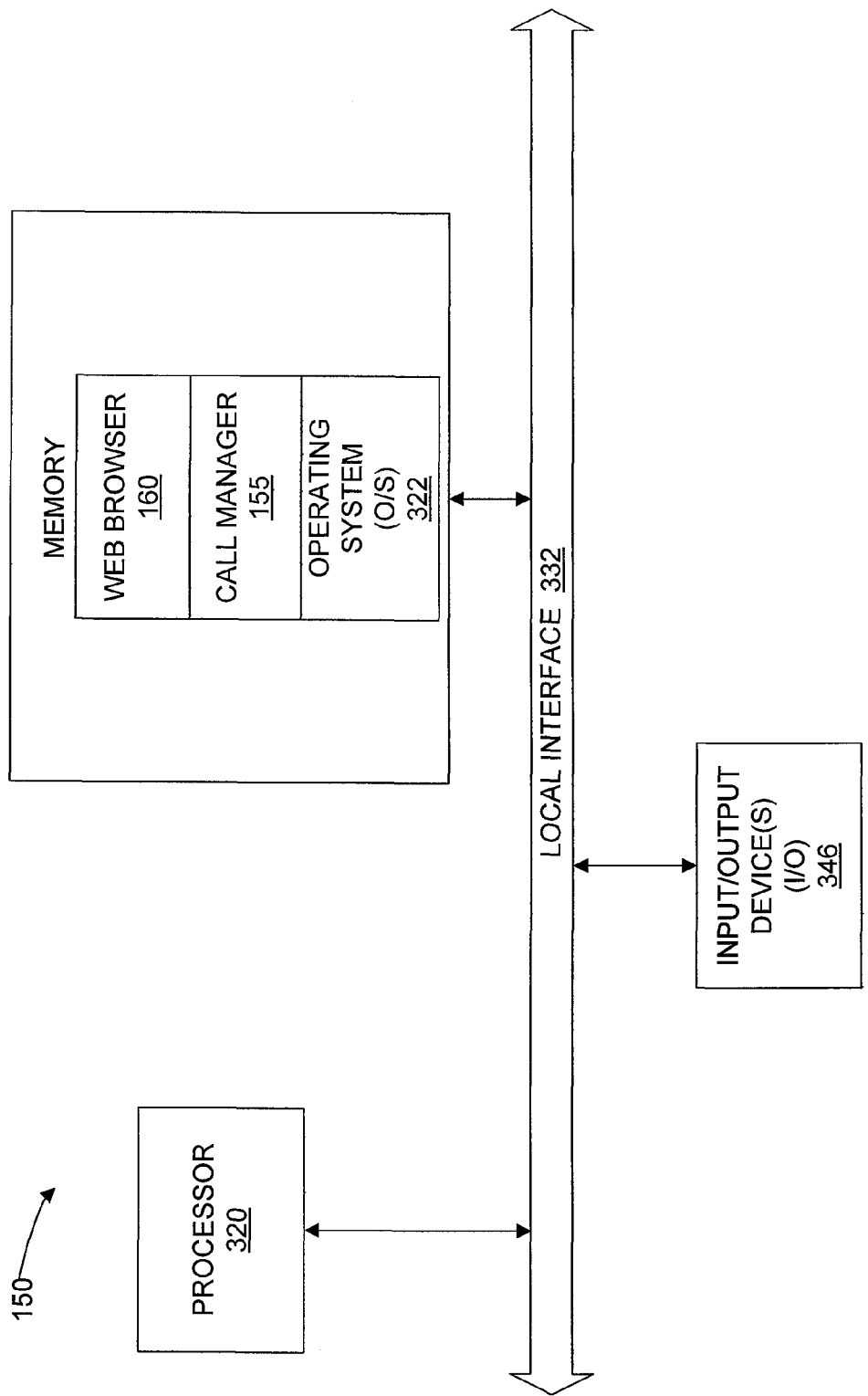
FIG. 3 is a block diagram of an embodiment of a client computer system utilized in the system of FIG. 1.

The call manager client 155, in one example, is shown residing in a memory subsystem 312, as shown in FIG. 3. The call manager client 155, however, could also reside in flash memory or a peripheral storage device. The computer system 150 also has one or more central processors 320 executing an operating system 322. The operating system 322, as is well known, has a set of instructions that control the internal functions of the computer system 150. A system bus or local interface 332 communicates signals, such as data signals, control signals, and address signals, between the central processor 320 and system components. The computer system includes one or more input and/or output (I/O) devices 346 (or peripherals) that are communicatively coupled via the local interface 332.

The system memory device 312 may also contain an application program, such as a web browser 160, as previously discussed. The web browser 160 cooperates with the operating system 322 and with a display unit 346 to provide a graphical user interface (GUI) for the call manager client 155, as previously discussed. As is apparent to those skilled in the art, the call manager client 155 is selected and arranged to provide branch exchange phone capabilities (e.g., transfer, hold, block, send to voice mail, etc.) while using consumer grade hardware and setting up an intelligent instant messaging client as a transport mechanism for PBX services. Accordingly, an instant message protocol may be used as a transport for performing Third Party Call Control (3PCC) of telephone services.

In one embodiment, the call manager client 155 allows a user to manage handling of incoming calls, such as (1) sending an incoming call to voice mail; (2) placing a call on hold, which may be accompanied by music instead of dead air; (3) setting up a conference call by adding an external party to the call; (4) forwarding or transferring the incoming call to another telephone number; etc.

Typically, a subscribing customer (i.e., a customer of a 3PCC service) or a user at the customer's premises has access to the computer system 150 and/or the telephone 160. For example, if a user wishes to call a particular telephone number, the user may use telephone 160 to dial the telephone number and establish a voice connection. If, however, the user wishes to send, receive, or access voice, video, and/or data (e.g., read and respond to e-mail, order products, view videoclips, listen to music, engage in an interactive gaming session, etc.), the computer system 150 may be used to access the Internet.

Whether the user is attempting to make a voice connection or a data connection, each telephone number dialed from the customer's premises is sent to the network switch 140. Network switch 140 analyzes the destination telephone number and determines routing of the outgoing call. Depending on the dialed telephone number, the network switch 140 may route the outgoing call immediately over a PSTN to attempt a connection or the network switch 140 may route the call over a packet network to attempt a connection with an IP-based telephone. Further, the network switch 140 may communicate with a service control point (SCP) or similar database for further call processing and routing information.

The network switch 140 may therefore include a packet-based "softswitch" that uses software control to provide voice, video, and/or data services by dynamically changing its connection data rates and protocols types. If the network switch 140 should include a softswitch, an application server interfaces with the softswitch via a packet protocol, such as Session Initiation Protocol (SIP). For a PSTN type of switch, network switch 140 includes Advanced Intelligent Network (AIN) componentry controlling many features of the network. The signaling between the computer system 150, the switch 140, the PSTN including AIN componentry and/or application server interfaces are well understood in by those of ordinary skill the art and will not be further described.

According to exemplary embodiments, the call manager module 110 communicates using transmission control protocol and Internet protocol (TCP/IP). The call manager module 110 may store a database of user profiles including information used to communicate with a respective user over an instant messaging session, such as instant messaging addresses. The user interacts with the call manager client 155 to access and log into the instant messaging server 120 and to establish an instant messaging session. The call manager module stub 115 of the instant messaging server 120 has access to the user's current presence status and instant messaging address since the user authorizes the Call Manager service to access this information or has provided such information to the respective components.

A telecommunications system in accordance with FIG. 1 may detect an incoming call to a computer or network station, such as a computer system 150. The incoming call is placed by a caller to a telephone number assigned to the computer system 150. The incoming call to the called telephone number is associated with the computer system 150. Because, however, a data connection is already established between the computer system 150 and the instant messaging server 120, in an embodiment, the switch 140 requests the call manager module 110 to route an incoming call notification to the network station over the instant messaging session between the instant messaging server 120 and the computer system 150. This incoming call notification alerts the called party that an incoming call has been received and prompts a user of the computer system 150 to choose an option for disposing of the call. By responding to the notification, the computer system 150 may direct the telephone call to another exchange, such as VoIP phone 160.

In FIG. 1, computer system 150 has been described as being used to make call dispositions. However, any communications device having instant messaging capabilities may be used in such a manner, including, for example, a personal digital assistant (PDA), an interactive television, a broadband telephone with instant messaging capabilities, etc.

Figure 4:
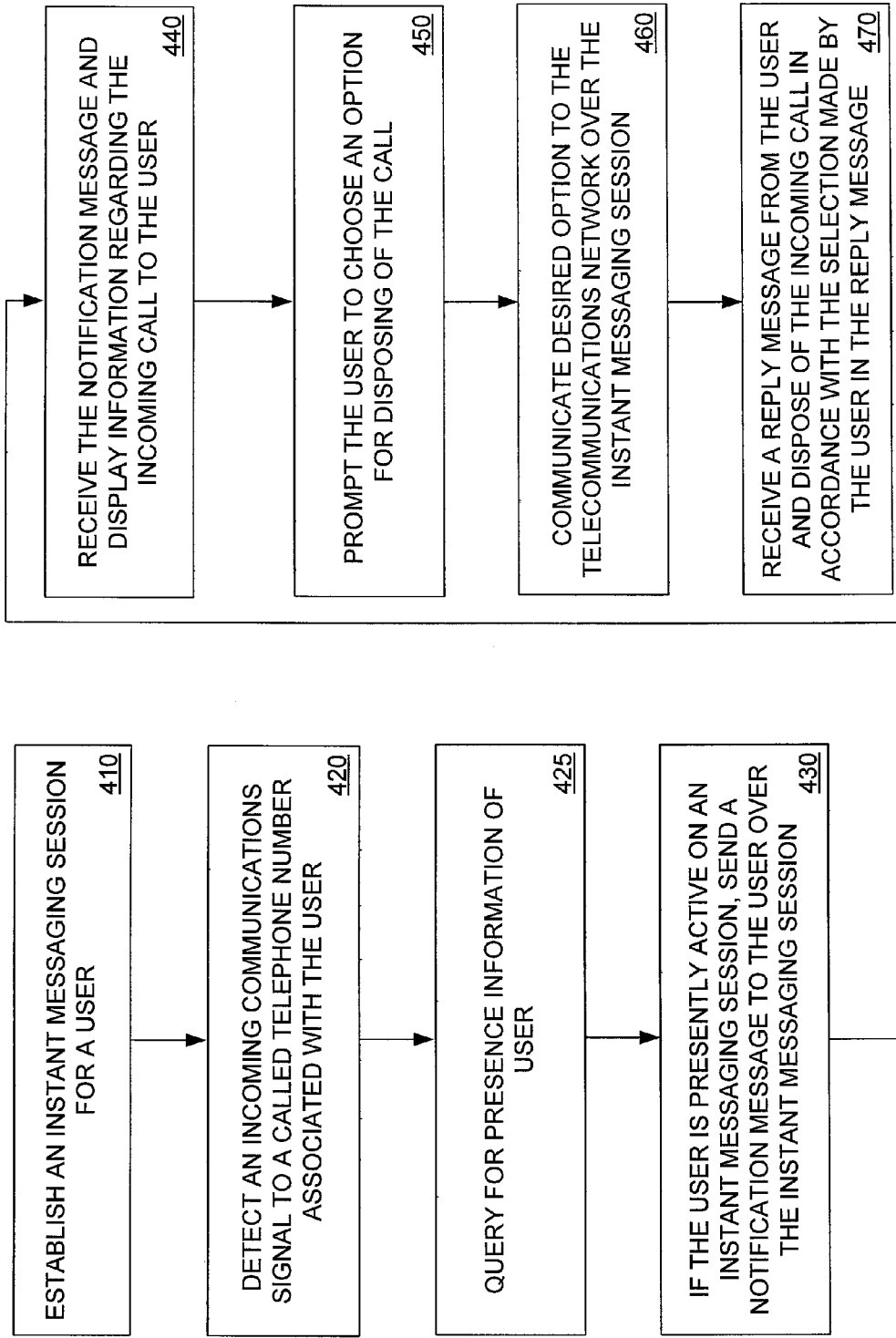
FIG. 4 is a flow chart diagram of an embodiment, among others, of a process for call management in accordance with the present disclosure.

FIG. 4 illustrates a flowchart showing an overview of a process for call management according to an embodiment of the present disclosure. A customer or user connects to a data network and establishes an instant messaging session (block 410). A telecommunications network detects (block 420) an incoming communications signal to a called telephone number associated with the user. The telecommunications network queries (block 425) the instant messaging server 120 to determine if the user is presently active on an instant messaging session. If the user is presently active on an instant messaging session, the telecommunications network sends (block 430) a notification message to the user over the instant messaging session. The notification message is received by the computer system 150 of the user. The computer system 150 displays (block 440) information regarding the incoming call (e.g., caller-ID information) to the user and prompts (block 450) the user to choose an option for disposing of the call. The user replies with an instant messaging containing selection of the desired option, which is communicated (block 460) to the telecommunications network over the instant messaging session. The telecommunication network receives the reply message and disposes (block 470) of the incoming call in accordance with the selection made by the user.

Figure 5:
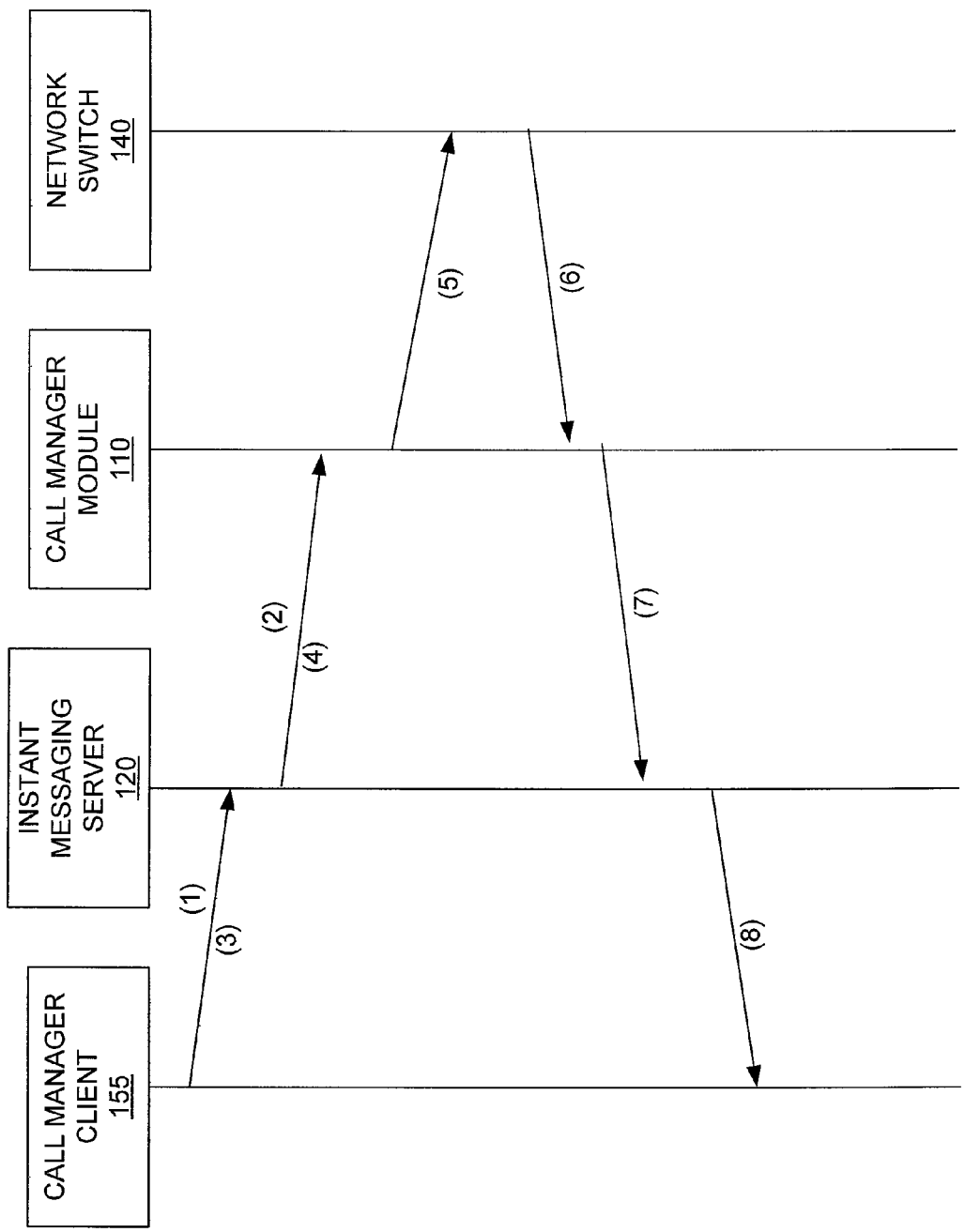
FIGS. 5-7 are flow diagrams of communications amongst components of the system diagram of FIG. 1.

FIG. 5 is a flow diagram for one embodiment of the system of FIG. 1. In the figure, the call manager client 155 provides (1) presence information to the instant messaging server 120 on the availability of the user. The instant messaging server 120 passes (2) the presence information to the call manager module 110. The call manager client 155 also logs (3) into the instant messaging server 120, which causes the instant messaging server 120 to inform (4) the call manager module 110 that the user is active in an instant messaging session. In one embodiment, the call manager module 110 proceeds to establish (5) a connection between the call manager client 155 and the network switch 140. Acknowledgment of the connection is passed (6) from the network switch 140 to the call manager module 110. The call manager module 110 passes or relays (7) the acknowledgement to the instant messaging server 120. The instant messaging server 120 passes (8) the acknowledgement to the call manager client 155.

Figure 6:
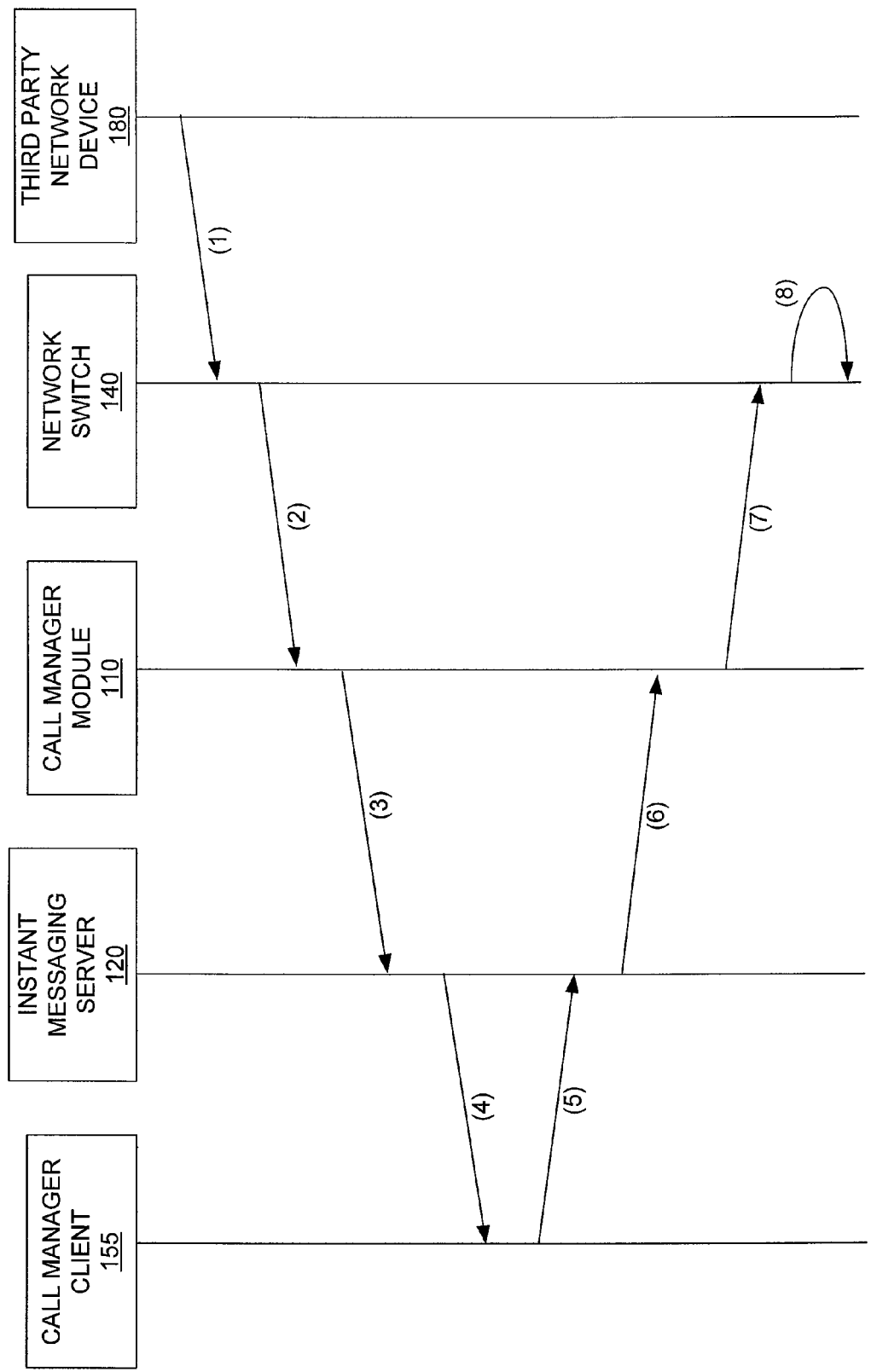

FIG. 6 is a flow diagram for one embodiment of the system of FIG. 1. In the figure, a third party network device 180, such as a VoIP telephone, sends (1) an invite message to the network switch 140 attempting to make a connection with a network station, such as computer system 150 hosting the call manager client 155. The network switch 140 updates the call manager module 110 of the new call request. The call manager module 110 uses (3) the instant messaging server 120 to send (4) an instant message to the call manager client 155 alerting a user of the Client 155 of the new call and providing the user options for handling the call. The options are displayed to the user at the computer system 150.

In this example, the user selects the option of sending the call to voice mail. Accordingly, an instant message is sent (5) from the call manager client 155 to the call manager module 110 via (6) the instant messaging server 120. The instant message contains the user's selection of the desired option for handling or disposing of the call. The call manager module 110 receives the instant message and then instructs (7) the network switch 140 on the desired action which is to send the call to voice mail. The network switch 140 in response transfers (8) the call to voice mail in accordance with the end user's instructions.

Figure 7:
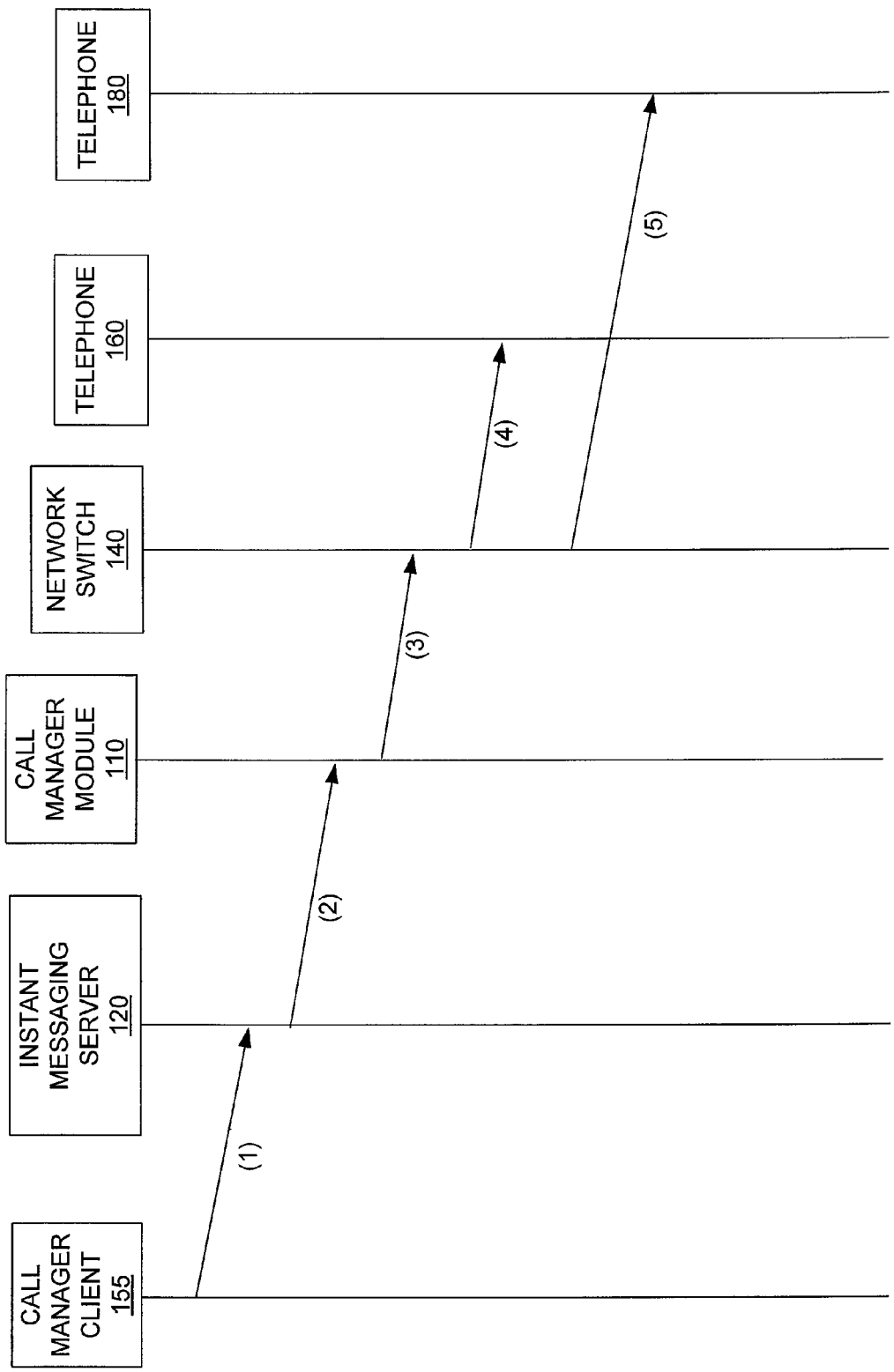

FIG. 7 is a flow diagram for one embodiment of the system of FIG. 1. In the figure, a user at the call manager client 155 "clicks" on a telephone number as part of a graphical interface, whether in an address book interface or on a web page, intending to have the call manager client 155 cause the clicked telephone number to be called over VoIP communications. In response to clicking the telephone number, the call manager client 155 sends (1) an instant message to the instant messaging server 120 identifying the clicked telephone number. The instant message is relayed (2) to the call manager module 110 from the instant messaging server 120. The call manager module 110 receives the message and then instructs (3) the network switch 140 to attempt a telephone call between a network terminal, such as a telephone 160, of the user and a third party phone 180 associated with the clicked telephone number. Accordingly, the call manager module 110 establishes a session on behalf of the call manager client 155 with the network switch 140 and relays the desired call disposition.

Accordingly, the network switch 140 sends (4) an invite message to the user's telephone 160. An invite message is also sent (5) to the third party telephone 180 associated with the clicked telephone number and additional signaling may then be performed to establish the call.

Figure 8:
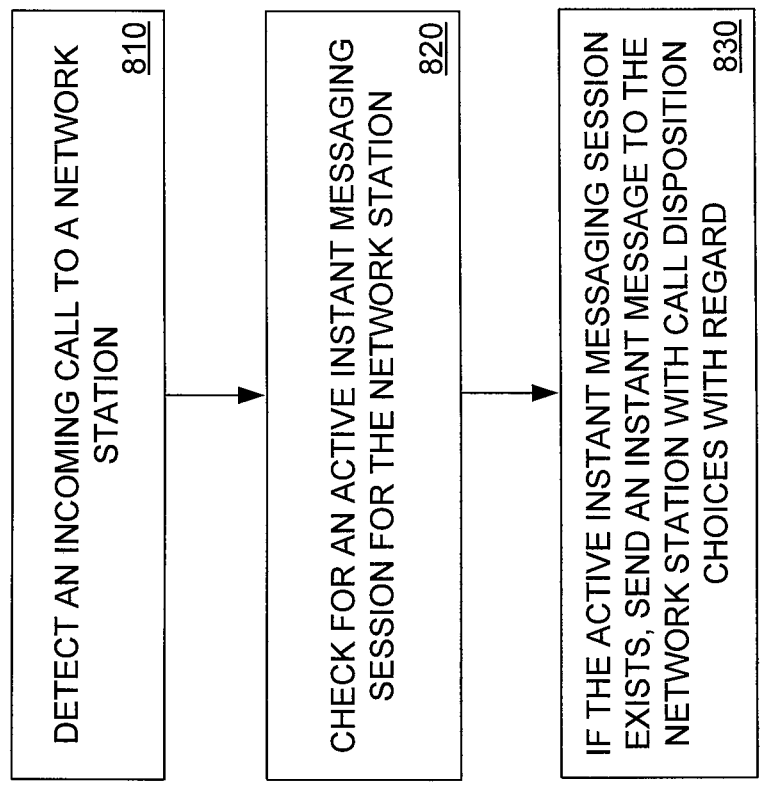
FIG. 8 is a flow chart diagram of one embodiment, among others, of a process for controlling disposition of a call in accordance with the present disclosure.

Referring now to FIG. 8, a flow chart diagram of one embodiment, among others, of a method of controlling disposition of a call is shown. In the method, an incoming call to a network station (e.g., a telephone, a computer, etc.) is detected (810) by a network switch 140. In response to the detection of the incoming call, an active instant messaging session for the network station is checked (820) by communications between the network switch 140, call manager module 110, and instant messaging server 140. If the active instant messaging session exists, an instant message to the network station is then sent (830) with call disposition choices with regard to the incoming call from the call manager module 110 via the instant messaging server 140. In one embodiment, a carrier network device, such as a VoIP feature server and/or softswitch may implement and perform the aforementioned operations. For example, the carrier networking device may facilitate an exchange service to the network station. The method may also include additional operations such as receiving a reply from the network station with a selected choice for disposing of the incoming call and disposing of the call in accordance with the selected choice. At the network station, contents of an instant message received from the call manager module 110 may be displayed with a web browser application, in some embodiments. Accordingly, an end user would not have to invest in expensive hardware or software to receive exchange services from a carrier network. Further, the instant messaging infrastructure is readily available to be used by any carrier network wanting to provide exchange services in accordance with the present disclosure.

Embodiments of the present disclosure provide an interface to the network switch 140 (e.g., Broadsoft switch) for the call manager client 155 via an Instant Messaging session (e.g., using extensible messaging and presence protocol (XMPP) via Jabber Instant Messaging and Presence technology). In one embodiment, the call manager client is a Flash application on a computing device.

Several exemplary implementations of various embodiments of the present disclosure are described herein; however, various modifications and alternate embodiments will occur to those of ordinary skill in the art. For example, the call manager client 155 and/or call manager module 110 discussed above may be physically embodied on or in a computer-readable medium, such as a CD-ROM, DVD, tape, cassette, floppy disk, memory card, and large-capacity disk (such as IOMEGA, ZIP, JAZZ, and other large-capacity memory products). This computer-readable medium, or media, could be distributed to end-customers, licensees, and assignees. These types of computer-readable media, and other types not mention here but considered within the scope of this disclosure (such as an Internet file that could be downloaded to the computer system 110, 150), allow the call manager client 155 and/or call manager module 110 to be easily disseminated. Accordingly, the present disclosure is intended to include those other variations, modifications, and alternate embodiments that adhere to the spirit and scope of this disclosure.

Certain embodiments of the present disclosure can be implemented in hardware, software, firmware, or a combination thereof. In some embodiments, system components are stored in a memory and that is executed by a suitable instruction execution system. If implemented in hardware, as in an alternative embodiment, system components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of one or more embodiments of the present disclosure in which functions may be executed out of order from that shown or discussed, including substantially concurrently or in reverse order, depending on the functionality involved, as would be understood by those reasonably skilled in the art of the present disclosure.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the present disclosure. All such modifications and variations are intended to be included herein within the scope of this disclosure.

Therefore, having thus described the invention, at least the following is claimed:

1. A method of controlling disposition of a call comprising:
at a call manager client executing on a network station, providing presence information to an instant messaging server separate from the network station, the instant messaging server providing instant messaging services to the network station;
at a call manager module stub of the instant messaging server, passing the presence information to a call manager module of a server;
the call manager client logging into the instant messaging server, the instant messaging server informing the call manager module of an active instant messaging session;
the call manager module establishing a connection between the call manager client and a network switch;
the network switch providing acknowledgement of the connection to the call manager module;
the call manager module relaying the acknowledgement of the connection to the instant messaging server;
the instant messaging server relaying the acknowledgement of the connection to the call manager client;
the network switch detecting an incoming call to the network station;

the network switch notifying the call manager module of the incoming call;

the call manager module checking for a presently active instant messaging session for the network station by querying the instant messaging server to determine if the network station is presently active on an instant messaging session; and if the active instant messaging session exists, sending an instant message over the instant messaging session to the network station with call disposition choices with regard to the incoming call;

the call manager client sending an instant message including a selected call disposition choice to the instant message server;

the instant message server relaying the selected call disposition choice to the call manager module;

the call manager module instructing the network switch to process the incoming call in response to the selected call disposition choice.

2. The method of claim 1, wherein the network switch facilitates an exchange service to the network station, the network station being a computer having an instant messaging client.

3. The method of claim 1, further comprising: displaying contents of the instant message having the call disposition choices within a web browser display at the network station.

4. The method of claim 1, wherein the call disposition choices comprise an option for transferring the incoming call to another exchange.

5. The method of claim 1, wherein the call disposition choices comprise an option for transferring the incoming call to voice mail.

6. The method of claim 1, wherein the incoming call is a voice over Internet protocol communication.

* * * * *